United States Patent
Ahn (10) Patent No.: US 9,752,065 B2
(45) Date of Patent: Sep. 5, 2017

(54) SEALANT COMPOSITIONS, METHODS OF PREPARING SEALANT COMPOSITIONS AND DISPLAY PANEL INCLUDING SEALANTS

(71) Applicant: Samsung Display Co., Ltd., Yongin, Gyeonggi-Do (KR)

(72) Inventor: Byung-Wook Ahn, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 238 days.

(21) Appl. No.: 14/517,045

(22) Filed: Oct. 17, 2014

(65) Prior Publication Data

US 2015/0184041 A1    Jul. 2, 2015

(30) Foreign Application Priority Data

Jan. 2, 2014 (KR) .......... 10-2014-0000151

(51) Int. Cl.
| | | |
|---|---|---|
| *C08K 9/10* | (2006.01) | |
| *C09J 163/00* | (2006.01) | |
| *C09J 163/10* | (2006.01) | |
| *C09K 3/10* | (2006.01) | |

(52) U.S. Cl.
CPC .......... *C09J 163/00* (2013.01); *C09J 163/10* (2013.01); *C08K 9/10* (2013.01); *C09K 3/10* (2013.01); *C09K 3/1021* (2013.01); *C09K 2003/1056* (2013.01); *Y10T 428/31511* (2015.04)

(58) Field of Classification Search
None
See application file for complete search history.

(56) References Cited

U.S. PATENT DOCUMENTS

| | | | |
|---|---|---|---|
| 6,466,294 B1 | 10/2002 | Yamagishi et al. | |
| 7,108,914 B2 * | 9/2006 | Skipor | B01J 13/02 257/E21.505 |
| 2010/0243157 A1 | 9/2010 | Son et al. | |
| 2011/0057174 A1 | 3/2011 | Nam | |
| 2012/0154717 A1 | 6/2012 | Chung et al. | |
| 2013/0340921 A1 * | 12/2013 | Sung | B05C 5/0216 156/145 |

FOREIGN PATENT DOCUMENTS

| | | |
|---|---|---|
| KR | 10-0525226 B1 | 10/2005 |
| KR | 1020110027082 A | 3/2011 |
| KR | 1020120067164 A | 6/2012 |
| KR | 1020130142784 A | 12/2013 |

OTHER PUBLICATIONS

Brochu, A. et al., "Microencapsulation of 2-octylcyanoacrylate tissue adhesive for self-healing acrylic bone cement." J. Biomed. Mater. Res. Part B 2012, 100B, 1764-1772.*
Jin, H. et al., "Self-healing thermoset using encapsulated epoxy-amine healing chemistry." Polymer 2012, 53, 581-587.*

* cited by examiner

*Primary Examiner* — Richard A Huhn
(74) *Attorney, Agent, or Firm* — Cantor Colburn LLP (57) ABSTRACT

A sealant composition includes a curable sealing resin, and a plurality of microcapsules dispersed in the sealing resin. Each of the plurality of microcapsules includes a self-curable healing agent and a capsule coating film encapsulating the healing agent.

18 Claims, 5 Drawing Sheets

SEALANT COMPOSITIONS, METHODS OF PREPARING SEALANT COMPOSITIONS AND DISPLAY PANEL INCLUDING SEALANTS

This application claims priority to Korean Patent Application No. 10-2014-0000151, filed on Jan. 2, 2014, and all the benefits accruing therefrom under 35 USC §119, the content of which in its entirety is herein incorporated by reference.

BACKGROUND

1. Field

Disclosed herein are sealant compositions, methods of manufacturing the same and display panels including the same. More particularly, exemplary embodiments relate to curable sealant compositions, methods of manufacturing the same and display panels including the same.

2. Description of the Related Art

Display devices, such as an organic light emitting display ("OLED") device or a liquid crystal display ("LCD") device, have been developed to have an improved resolution and a compact size. Accordingly, the thickness of the display device is becoming smaller.

An electronic device such as the display device, may include a sealant protecting and encapsulating an electronic element from the external environment. As the display device becomes miniaturized, thickness of the sealant layer may be decreased. Accordingly, there is a need for a sealant layer having sufficient durability from the external environment and a relatively small thickness.

SUMMARY

In exemplary embodiments, a sealant composition having improved durability is provided.

In some exemplary embodiments, a method of preparing a sealant composition having improved durability is provided.

In other exemplary embodiments, a display panel including a sealant having improved durability is provided.

According to some exemplary embodiments, a sealant composition includes a curable sealing resin, and a plurality of microcapsules dispersed in the sealing resin, and each of the microcapsules includes a self-curable healing agent and a capsule coating film encapsulating the healing agent.

In exemplary embodiments, the healing agent is self-cured upon exposure to moisture.

In exemplary embodiments, the healing agent includes a cyanoacrylate derivative or a urethane derivative.

In exemplary embodiments, the capsule coating film has an elastic modulus lower than an elastic modulus of the sealing resin.

In exemplary embodiments, the capsule coating film has a moisture permeability greater than a moisture permeability of the sealing resin.

In exemplary embodiments, the capsule membrane includes at least one of an acrylate-based polymer, a polyurethane-based polymer and a polyurea-based polymer.

In exemplary embodiments, each of the microcapsules has a diameter of about 2 micrometers ($\mu m$) to about 20 $\mu m$.

In exemplary embodiments, an amount of the microcapsules is equal to or less than about 20% by volume, based on a total volume of the sealant composition.

In exemplary embodiments, the sealing resin includes a modified epoxy resin including at least one of an acrylate group, an isocyanate group and a hydroxyl group.

In exemplary embodiments, the sealant composition further includes an alkali metal-based catalyst.

In exemplary embodiments, the sealant composition further includes a softening agent.

According to some exemplary embodiments, a method of manufacturing a sealant composition includes preparing a self-curable healing agent solution, forming a capsule coating film encapsulating the healing agent, curing the capsule coating film to form a plurality of microcapsules, and mixing the microcapsules with a curable sealing resin.

In exemplary embodiments, the healing agent solution is prepared by dispersing a cyanoacrylate derivative or a urethane derivative into an organic solvent.

In exemplary embodiments, a step of forming the capsule coating film includes extruding a coating solution together with the healing agent solution through a micro-nozzle, and forming a droplet which includes the capsule coating film and the healing agent solution.

In one exemplary embodiment, the coating solution includes a polymer for forming the capsule coating film.

In exemplary embodiments, the droplet is formed using an ultrasonic wave generator.

In exemplary embodiments, the polymer for forming the capsule coating film includes at least one of an acrylate-based polymer, a polyurethane-based polymer and a polyurea-based polymer.

According to exemplary embodiments, a display panel includes a first substrate, a display element including a plurality of pixels on the first substrate, a second substrate facing the first substrate, and a sealant surrounding the display element between the first substrate and the second substrate, where the sealant includes a curable sealing resin, and a plurality of microcapsules dispersed in the sealing resin, and each of the microcapsules includes a self-curable healing agent and a capsule coating film encapsulating the healing agent.

In exemplary embodiments, the healing agent includes a cyanoacrylate derivative or a urethane derivative.

In exemplary embodiments, the capsule coating film has an elastic modulus lower than an elastic modulus of the sealing resin.

In example embodiments, the capsule coating film has a moisture permeability greater than a moisture permeability of the sealing resin.

Therefore, the sealant composition according to exemplary embodiments includes microcapsules including a self-curable healing agent. Thus, upon exposure to external moisture. The sealant may rapidly cure a crack and prevent propagation and growth of the crack. Thus, a display panel having a relatively small thickness may be manufactured using the sealant composition.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE EMBODIMENTS

Various example embodiments will be described more fully hereinafter with reference to the accompanying drawings, in which some example embodiments are shown.

The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity. Like numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first", "second", "third" etc. may be used herein to describe various elements, these elements should not be limited by these terms. These terms are used to distinguish one element, component, region, layer or section from another element, component, region, layer or section. Thus, a "first element," "component," "region," "layer" or "section" discussed below could be termed a "second element," "component," "region," "layer" or "section" without departing from the teachings of the teachings herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used herein is for the purpose of describing particular example embodiments only and is not intended to be limiting. As used herein, the singular forms "a," "an" and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
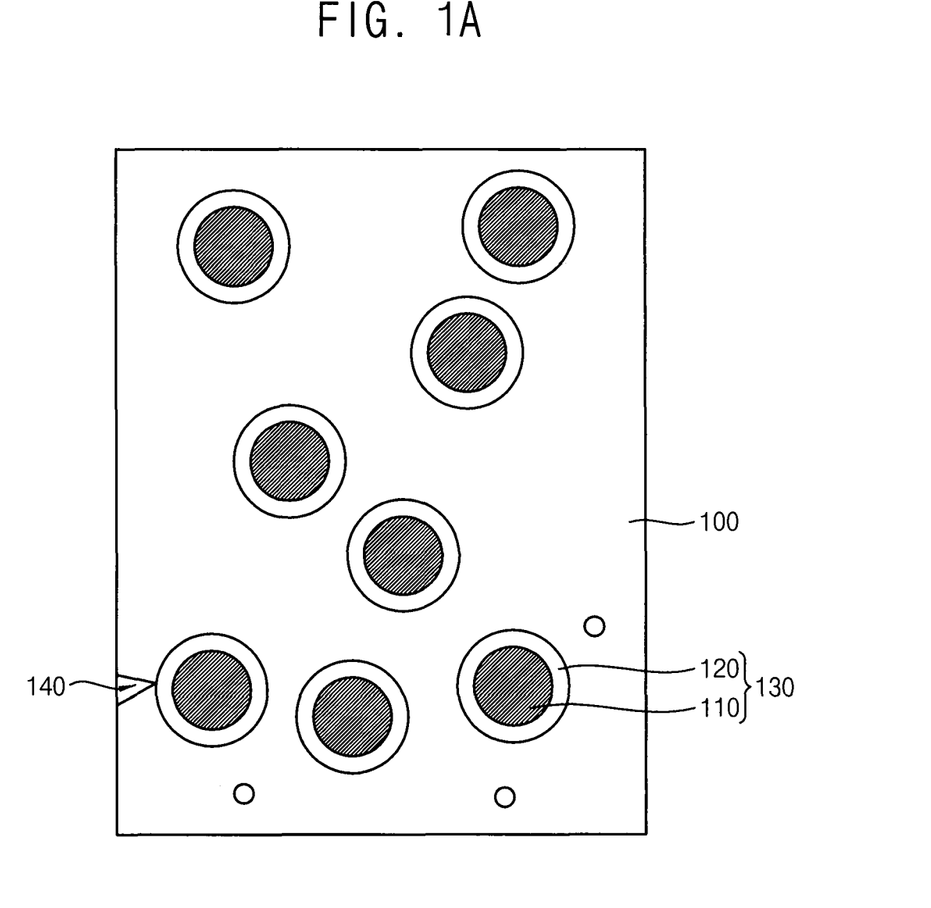
FIGS. 1A through 1C are schematic views illustrating the various components of an exemplary sealant composition and a self-curing process of the sealant composition.
Figure 1B:
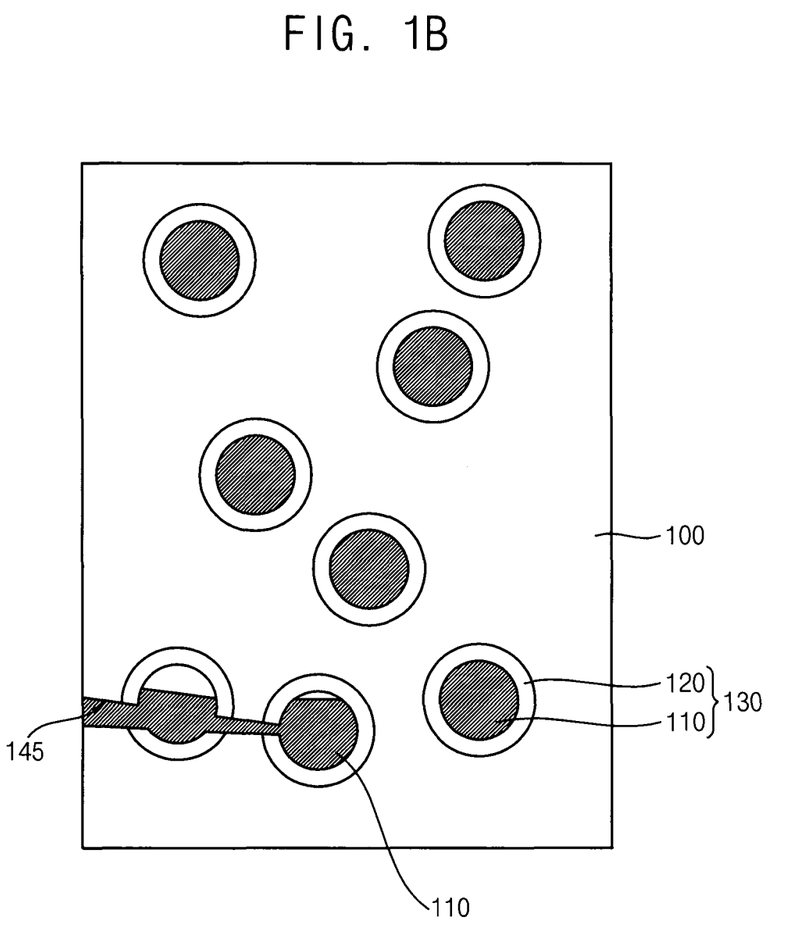
Figure 1C:
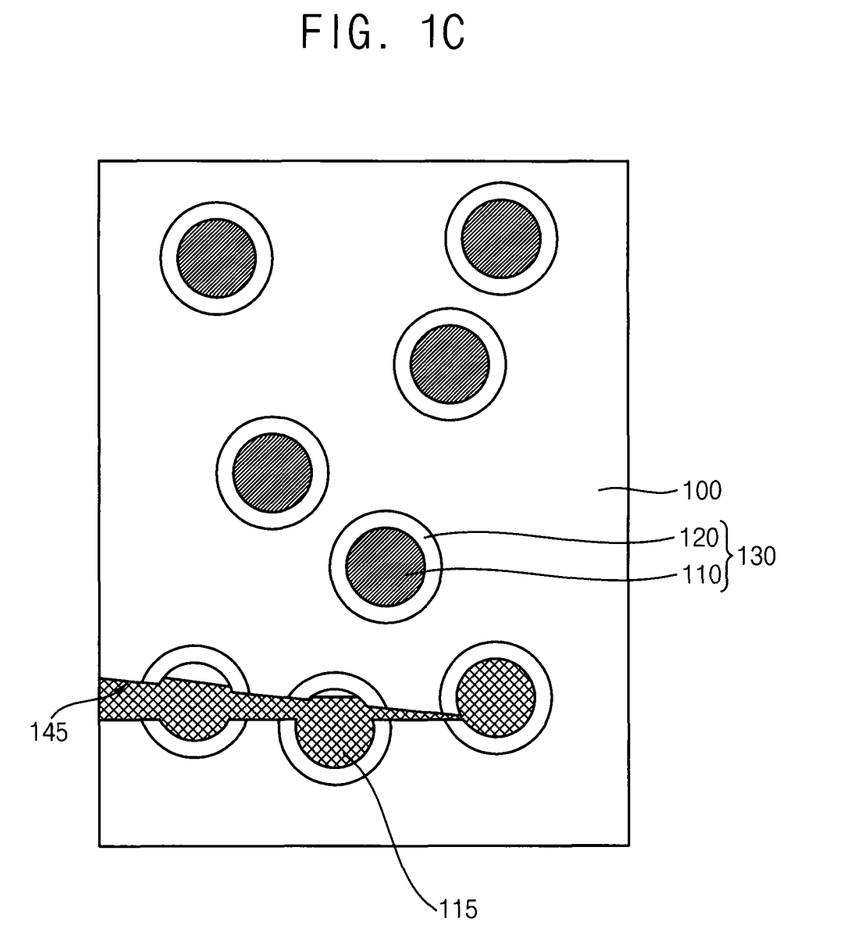

FIGS. 1A through 1C are illustrations depicting the components of an exemplary sealant composition and a self-curing process of the sealant composition.

Referring to FIG. 1A, the sealant composition may include a sealing resin 100 and a plurality of microcapsules 130.

The sealant composition may be used to prepare a sealant which encapsulates elements of electronic devices thereby effectively sealing them from the external environment, and may also be used to adhere or combine individual substrates to each other. In exemplary embodiments, the sealant may combine a first substrate and a second substrate applied to a display device, e.g., an LCD device and an OLED device, and may protect elements (e.g., pixels) of the display panel from the external environment.

The sealing resin 100 may serve as a dispersion medium in which the microcapsules 130 are dispersed. The sealing resin 100 may provide some chemical properties for the sealant composition e.g., curability and adhesiveness.

In example embodiments, the sealing resin 100 may include a modified epoxy resin including an acrylate group, an isocyanate group and/or a hydroxyl group. The modified epoxy resin may be at least one of bisphenol A type epoxy resin, bisphenol F type epoxy resin, novolac type epoxy resin, brominated epoxy resin, cycloaliphatic epoxy resin, rubber modified epoxy resin, aliphatic polyglycidyl type epoxy resin, glycidyl amine type epoxy resin, biphenyl type epoxy resin, naphthalene type epoxy resin and tris-phenol methane type epoxy resin. The modified epoxy resins may be used alone or in combinations thereof.

In exemplary embodiments, the sealant composition may further include a hardener. The hardener may include a photocurable hardener or a thermosetting hardener. The photocurable hardener may be at least one of dipentaerythritol hexaacrylate, dicyclopentadiene acrylate, dicyclopentadiene methacrylate, trimethylpropane triacrylate, glycidyl methacrylate, diethylene glycol dimethacrylate, ethylene glycol acrylate and ethylene glycol dimethacrylate. The thermosetting hardener may be at least one of an amine-based hardener, an anhydride-based hardener and an imidazole-based hardener. Specifically, the thermosetting hardener may be at least one of diaminodiphenylmethane ("DDM"), tetrahydrophthalic anhydride ("THPA"), 3-(3,4-dichlorophenyl)-1,1-dimethylurea ("DCMU"), sulfonium salt, biphenyl ether block carboxylic acid, 1-cyanoethyl 2-phenylimidazole ("TCI"), 1,1-dimethoxy-N,N-dimethyl methanamine, isopropylamine, 1-methoxyimidazole and 1-vinylimidazole. The photocurable hardeners may be used alone or in combinations thereof.

In exemplary embodiments, if the hardener is a photocurable hardener, the sealant composition may further include a photoinitiator. The photoinitiator may initiate a curing reaction of the photocurable hardener. The photoinitiator may include at least one of 1-phenyl-2-hydroxy-2-methylpropane-1-one, 1-hydroxycyclohexyl phenyl ketone, aminoacetophenone, benzyl dimethyl ketal, benzoin ether, thioxanthone, 2-ethylanthraquinone ("2-ETAQ"), camphorquinone, alpha-naphthol, 2,4-diethylthioxanthone, trimethylbenzoyl diphenylphosphine oxide, benzophenone, 2,2-diethoxyacetophenone and benzyl isopropyl ether. The photoinitiators may be used alone or in combinations thereof.

In exemplary embodiments, the hardener and/or the photoinitiator may be dispersed or dissolved uniformly or regularly in the sealing resin 100.

The microcapsule 130 may include a self-curable healing agent 110 and a capsule coating film 120 which encapsulates the healing agent 110.

In exemplary embodiments, the microcapsule 130 may compensate for, or cure, a crack formed in the sealant, by way of the self-curable healing agent 110 included in the microcapsules. In display devices having a more aesthetic design (e.g., a slim bezel), a thickness of the sealant encapsulating the display panel is relatively smaller. However, as the thickness of the sealant becomes smaller, the sealant may have weak adhesion and high moisture permeability. In particular, a sealant having a thickness of about 300 micrometers (μm) has an adhesion of about 40% lower than the adhesion of a sealant having a thickness of about 800 μm, and a moisture permeability of about 60% greater than the moisture permeability of the sealant having a thickness of about 800 μm. As used herein, the moisture permeability refers to a quantity of moisture permeating through a specific material. When the sealant has a crack, the moisture permeability may be increased and the adhesion of the sealant may be reduced. If the crack is generated in the sealant, a stress may be concentrated on a sharp tip of the crack. When the stress is concentrated on the tip of the crack, the crack may be grown and propagated. Thus, the sealant may be decomposed or fractured by the crack. Further, pixels of the display device may be damaged by the moisture and the gas permeating through the cracks, and thereby deteriorate the durability of the display device. However, according to exemplary embodiments, the microcapsule 130 may prevent growth and propagation of the crack by compensating and self-curing the crack 140. Thus, a durability of the sealant may be improved.

As illustrated in FIG. 1A, the crack 140 may be generated in the sealant by an external shock.

Referring to FIG. 1B, when the crack 140 expands, a growing crack 145 may be formed. The growing crack 145 may penetrate the capsule coating film 120 of the microcapsule 130 dispersed in the sealant. When the capsule coating film 120 is fractured or broken, the healing agent 110 therein may flow out from the microcapsule 130 to at least partially fill the growing crack 140.

Referring to FIG. 1C, the healing agent 110 filling the growing crack 145 may be self-cured rapidly by moisture permeating through the growing crack 145. As a result, a healing structure 115 formed by the self-cured healing agent 110 may partially fill the growing crack 145. Therefore, the healing structure 115 may prevent the further growth and propagation of the growing crack 145. Further, the healing structure 115 may block the moisture and/or gas permeating from the external environment through the crack. In exemplary embodiments, if the sealant of the display panel is formed using the sealant composition, the sealant including the healing structure 115 may have a fracture toughness greater than about 70% of an initial fracture toughness even in the presence of the cracks generated by the external shock.

In exemplary embodiments, the healing structure 115 may be merged or combined with the neighboring sealing resin 100, so that the healing structure 115 serves as a component of the sealant composition or the sealant formed by the sealant composition. The healing agent 110 may include a material which may be rapidly cured by moisture, and the healing agent 110 may be included inside the capsule coating film 120 in a liquid state to easily fill the growing crack 145.

In exemplary embodiments, the healing agent 110 may include a monomer or a prepolymer which can be self-cured by moisture.

In exemplary embodiments, the healing agent 110 may include a urethane derivative. Specifically, the healing agent 110 may include at least one of polyurethane and silylated polyurethane. The urethane derivative may be cured by reaction of an isocyanate group with external moisture.

In exemplary embodiments, the healing agent 110 may include an acrylate derivative, for example, a cyanoacrylate derivative. The healing agent 110 may include at least one of octyl cyanoacrylate, dodecyl cyanoacrylate, 2-ethyl hexyl cyanoacrylate, methoxyethyl cyanoacrylate, 2-methoxyethyl 2-cyanoacrylate, butyl cyanoacrylate, ethyl cyanoacrylate, methyl cyanoacrylate, 3-methoxy butyl cyanoacrylate, 2-butoxy ethyl cyanoacrylate, 2-isopropoxy ethyl cyanoacrylate, 1-methoxy-2-propyl cyanoacrylate, butyl lactoyl cyanoacrylate, butyl glycolyl cyanoacrylate, isopropyl glycolyl cyanoacrylate, ethyl lactoyl cyanoacrylate, ethyl glycolyl cyanoacrylate, methoxy butyl cyanoacrylate and a combination thereof.

In an exemplary embodiment, the healing agent 110 may include methyl cyanoacrylate represented by Chemical Formula 1 below.

[Chemical Formula 1]

Polymerization of the healing agent 110 may be initiated by moisture as represented by Chemical Equation 1 below.

[Chemical Equation 1]

Further, the healing agent 110 reacted with the moisture may react with another healing agent molecule resulting in a chain growth as represented by Chemical Equation 2 below.

[Chemical Equation 2]

The healing agent 110 including cyanoacrylate may prevent the growth and propagation of the cracks in the sealant by a self-curing mechanism represented by Chemical Equations 2 and 3 above. In an exemplary embodiment, the self-curing mechanism may include an anionic polymerization.

In exemplary embodiments, the sealant composition may include a catalyst catalyzing the self-curing mechanism of the healing agent 110. The catalyst may provide a cation and an electron for the self-curing mechanism of healing agent 110. The catalyst may include an alkali metal-based catalyst such as potassium hydroxide (KOH) or sodium hydroxide (NaOH).

The capsule coating film 120 may encapsulate the healing agent 110 to preserve the healing agent 110, so that the healing agent 110 may be maintained in the liquid state.

The capsule coating film 120 may be a spherical solid film. In exemplary embodiments, the thickness of the capsule coating film 120 may be relatively small so as to be easily fractured or decomposed when contacted by the crack. In exemplary embodiments, the capsule coating film 120 may have a predetermined elastic modulus such that the capsule coating film 120 may be easily fractured or decomposed by the crack. As described herein, the elastic modulus refers to a ratio of the stress applied to a material to the strain of the material induced by the stress. The material having a high elastic modulus has great strength and hardness.

In exemplary embodiments, the capsule coating film 120 may have an elastic modulus which is lower than the elastic modulus of the sealing resin 100. If the capsule coating film 120 has an elastic modulus lower than that of the sealing resin 100, the crack 140 can be propagated to the microcapsule 130, and as a result, the crack 140 may fracture or decompose the capsule coating film 120. Thus, the crack 140 may be cured, or compensated for, by the self-curing mechanism as represented by Chemical Equations 1 and 2 above. However, if the capsule coating film 120 has an elastic modulus greater than that of the sealing resin 100, the crack 140 may be grown and propagated to the sealing resin 100 and contact the microcapsule 130, but the capsule coating film 120 of the microcapsule 130 may not rupture and therefore may not cure the crack 140. Therefore, the capsule coating film 120 has an elastic modulus lower than the elastic modulus of the sealing resin 100. In an exemplary embodiment, if the sealing resin 100 has an elastic modulus of about 1 giga-Pascal (GPa), the capsule coating film 120 may have an elastic modulus lower than about 1 GPa. However, the elastic modulus of the capsule coating film 120 is not limited to a specific value.

In exemplary embodiments, the capsule coating film 120 may have a moisture permeability greater than the moisture permeability of the sealing resin 100. The moisture permeability described herein refers to a quantity of moisture absorbed in a unit area of a specific material when the material is exposed at an atmosphere having a predetermined temperature and relative humidity for a period of one day (24 hours). If the capsule coating film 120 has a moisture permeability greater than that of the sealing resin 100, moisture input through the crack 140 may easily flow from the external environment to the healing agent 110. However, if the capsule coating film 120 has a moisture permeability lower than the moisture permeability of the sealing resin 100, the moisture input through the crack may flow from the external environment to the sealing resin 100 and beside the healing agent 110 in the microcapsule 130. As a result, the healing agent 110 may not be cured rapidly, and it may take a long time to solidify the crack 140. Thus, the capsule coating film 120 may have a moisture permeability greater than the moisture permeability of the sealing resin 100. In an exemplary embodiment, the capsule coating film 120 may have a moisture permeability greater than about 72 grams per square meter per 24 hours ($g/(m^2 \cdot 24\ hr)$), as measured at a temperature of about 80° C. and a relative humidity of about 90%. However, the moisture permeability of the capsule coating film 120 is not be limited by a specific value. The moisture permeability may vary if the microcapsule 130 is exposed at atmosphere having another temperature and relative humidity.

A material of the capsule coating film 120 may not be limited, but may have similar properties to the sealing resin 100 to be easily harmonized with the sealing resin 100. In exemplary embodiments, the capsule coating film 120 may include at least one of an acrylate-based polymer, a polyurethane-based polymer and a polyurea-based polymer. Specifically, the capsule coating film may include at least one of poly(methyl methacrylate) ("PMMA"), poly(ethyl methacrylate), poly(butyl methacrylate), polyacrylonitrile, urea-formaldehyde, and the like. These may be used alone or in combinations thereof.

In exemplary embodiments, the sealant composition may further include a softening agent. The softening agent may provide flexibility to the sealant, which is formed by hardening of the sealant composition. The softening agent may include at least one of a thermoplastic resin, a phenolic resin, an elastomer, a reactive rubber and an organic elastic body-containing epoxy resin.

The thermoplastic resin may include at least one of polyethylene, polypropylene, polyvinyl acetate (PVA), polystyrene, acrylonitrile butadiene styrene (ABS) and acrylic resin may be used as the thermoplastic resin.

The elastomer may include at least one of polyisoprene, polyisobutylene, polybutadiene, polyvinyl chloride (PVC), polyurethane and polysiloxane.

The reactive rubber may include at least one of nitrile butadiene rubber (e.g., carboxylic acrylonitrile-butadiene rubber ("xNBR") and carboxyl-terminated butadiene acrylonitrile ("CTBN")), cis-isoprene rubber and styrene butadiene rubber.

The organic elastic body-containing epoxy resin may include at least one of an acrylate-group, an isocyanate group and a hydroxyl group.

As described above, although the crack 140 is generated in the sealant, the microcapsule 130 including the healing agent 110 may cure the crack 140. Since the healing agent 110 includes an acrylate group, an isocyanate group and/or a hydroxyl group, the healing agent 110 may be merged with the sealing resin 100 by improved affinity when the healing agent 110 cures the crack. Thus, the sealant may have sufficient fracture toughness even in the presence of the healing structure 115 in the sealant.

Figure 2:
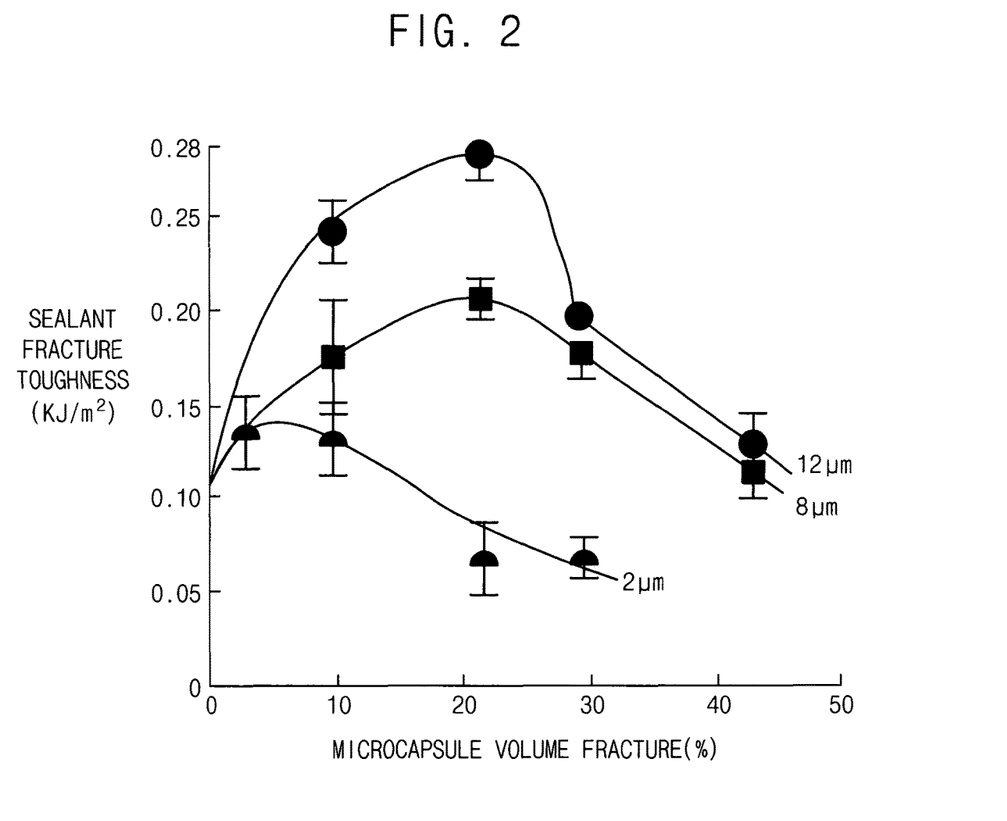
FIG. 2 is a graph illustrating the volume fraction (%) of microcapsules in the sealant composition versus sealant fracture toughness for sealants having a diameter of 2, 8 and 12 μm.

FIG. 2 is a graph illustrating the volume fraction (%) of microcapsules in the sealant composition versus sealant fracture toughness for sealants having a diameter of 2, 8 and 12 μm.

Referring to FIG. 2, the sealant formed by hardening of the sealant composition which includes the microcapsules 130 may have variable fracture toughness. The fracture toughness is determined by the diameter and the volume fraction of the microcapsules 130 in the sealant composition. An internal structure of the sealant may be changeable by the microcapsules 130, so that a path of the propagation or the growth of the crack may be changeable. Thus, the sealant fracture toughness may be changed. As illustrated in FIG. 2, when the volume fraction of the microcapsules 130 having a predetermined diameter is increased, the sealant fracture toughness may also be increased. However, when the volume fraction of the microcapsules 130 exceeds a predetermined value, the sealant fracture toughness may be decreased. Thus, the microcapsules 130 may be included in a suitable volume fraction in the sealant composition or the sealant to achieve the desired sealant fracture toughness.

In exemplary embodiments, a diameter of the microcapsule 130 may be equal to or less than about 20 μm. If the diameter of the microcapsule 130 is greater than about 20 μm, the sealing resin 100 may not encapsulate a gap between the first substrate and the second substrate due to the high diameter of the microcapsule 130, and as a result, encapsulation quality of the sealant may deteriorate. Further, the diameter of the microcapsule 130 may be greater than about 2 μm. As illustrated in FIG. 2, if the diameter of the microcapsule 130 is less than about 2 μm, the sealant formed by hardening of the sealant composition may have only a small amount of fracture toughness.

In exemplary embodiments, a volume fraction of the microcapsule 130 may be less than about 20% based on a total volume of the sealant composition. If the volume fraction of the microcapsules 130 is greater than about 20%, the sealant may have smaller fracture toughness.

Figure 3:
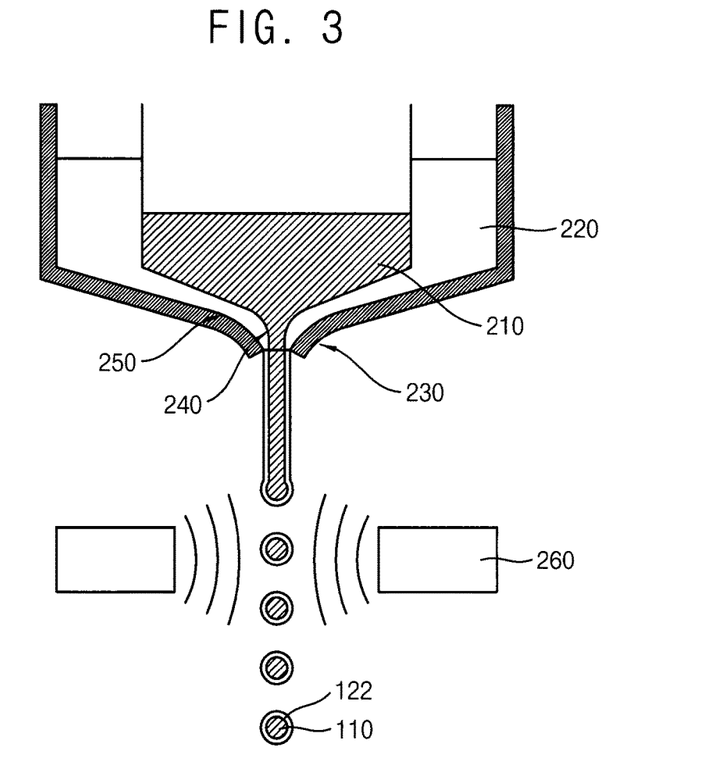
FIG. 3 is an illustration of an exemplary method of manufacturing the sealant composition.

FIG. 3 is an illustration of an exemplary method of manufacturing the sealant composition.

Referring to FIG. 3, the sealant composition may be prepared by forming microcapsules 130 and mixing the microcapsules 130 with a sealing resin 100.

A healing agent solution 210 may be prepared to form the microcapsules 130. The healing agent solution 210 may include a cyanoacrylate derivative or a urethane derivative, and the healing agent solution 210 may be formed by dispersing the derivatives with a solvent. An organic solvent not including moisture may be used as the solvent so as not to cure the cyanoacrylate derivative or the urethane derivative.

A coating solution 220 including a polymer for forming the capsule coating film may be prepared. The polymer for forming the capsule coating film may have an elastic modulus lower than the elastic modulus of the hardened sealing resin, and may have a moisture permeability greater than the moisture permeability of the sealing resin. Further, the polymer may be a material having similar properties to the sealing resin in order to be easily blended with the sealing resin. For example, the polymer may include at least one of PMMA, poly(ethyl methacrylate), poly(butyl methacrylate), polyacrylonitrile, and urea-formaldehyde, and the like.

The prepared healing agent solution 210 and the coating solution 220 may be extruded through a micronozzle 230.

The micronozzle 230 may include a center nozzle 240 extruding the healing agent solution 210 and a peripheral nozzle 250 extruding the coating solution 220. The peripheral nozzle 250 may surround the center nozzle 240. Each of the center nozzle 240 and the peripheral nozzle 250 may have a diameter corresponding to the predetermined diameter of the microcapsule 130. For example, a total diameter of the center nozzle 240 and the peripheral nozzle 250 may be less than about 20 μm.

The coating solution 220 extruded through the micronozzle 230 may surround the healing agent solution 210. In an exemplary embodiment, the healing agent solution 210 may be extruded through the center nozzle 240 and the coating solution 220 may be extruded through the peripheral nozzle 250, so that the coating solution 220 may surround the healing agent solution 210.

The healing agent solution 210 and the coating solution 220 extruded through the micro-nozzle 230 may be formed into a droplet.

In exemplary embodiments, the healing agent solution 210 and the coating solution 220 may be formed into a droplet by the ultrasonic wave generator 260. The ultrasonic wave generator 260 may generate an ultrasonic wave having a frequency of about 20 kiloHertz (KHz) to about 200 megaHertz (MHz).

The coating solution 220 may encapsulate the healing agent solution 210 by forming the droplet. As a result, a microcapsule including a healing agent 110 as a core material and a capsule coating film 122 surrounding (e.g. encapsulating) the healing agent 110, may be formed from the droplet.

The microcapsules 130 may be formed by curing the capsule coating film 122. The curing may be performed using heat and/or a light having a predetermined wave length. In an exemplary embodiment, the microcapsule 130 may be formed by placing the droplets formed by the ultrasonic wave generator 260 into a container, gradually increasing a temperature of the container (e.g., about 1° C. per minute), and when the temperature reaches a predetermined temperature, curing the capsule coating film 122 by maintaining the predetermine temperature for a predetermined amount of time.

The sealant composition may then be formed by mixing the microcapsules 130 formed as described above with the sealing resin 100.

The sealing resin 100 may include a material having similar properties to the sealing agent 110. For example, the sealing resin 100 may include a modified epoxy resin and a hardener. Each of the modified epoxy resin and the hardener may include at least one of an acrylate group, an isocyanate group and a hydroxyl group. Since a specific component and/or composition of the sealing resin 100 may be substantially same as or similar to that described above for the sealing agent 110, duplicate descriptions of the sealing resin 100 will not be repeated.

The microcapsules 130 may be mixed with a predetermined volume of the sealing resin 100 so as not to reduce the sealant fracture toughness. For example, the volume fraction of the microcapsules 130 in the sealant composition may be equal to or less than about 20% based on a total volume of the sealant composition.

In exemplary embodiments, a softening agent may be added to the sealant composition during the mixing of the microcapsules 130 with the sealing resin 100. The softening agent may provide flexibility for the sealant upon hardening of the sealant composition.

The softening agent may include at least one of a thermoplastic resin, a phenolic resin, an elastomer, a reactive rubber and an organic elastic body-containing epoxy resin.

Figure 4:
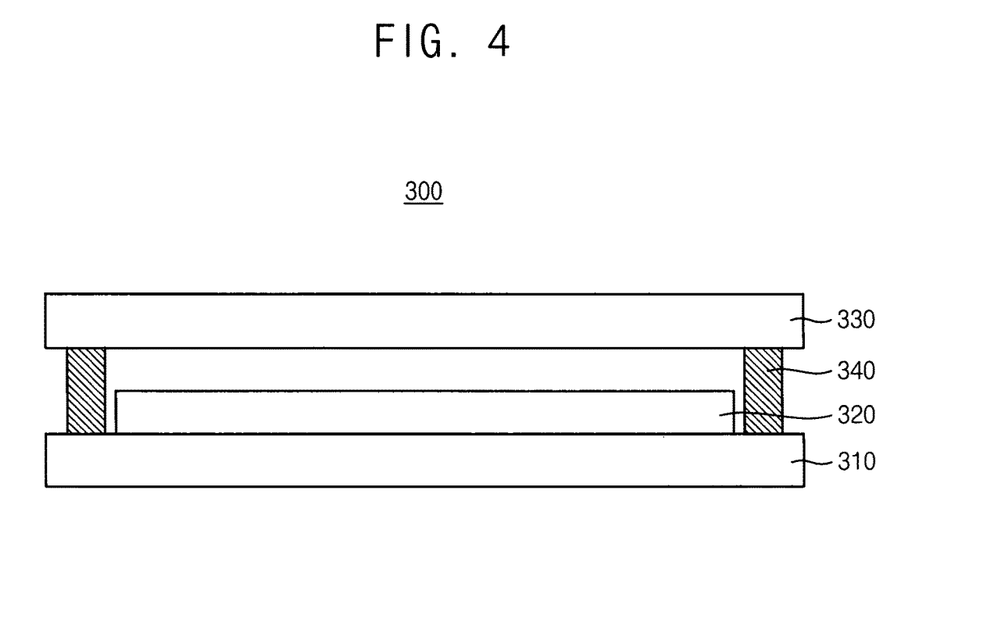
FIG. 4 is cross-sectional view illustrating an exemplary display panel.

FIG. 4 is cross-sectional view illustrating a display panel in accordance with exemplary embodiments.

Referring to FIG. 4, the display panel 300 may include a first substrate 310, a second substrate 330, a display element 320 and a sealant 340.

The display panel 300 may be a panel configuring a screen of various types of display apparatus. In exemplary embodiments, the display panel 300 may be an LCD panel, an OLED panel, a plasma display panel ("PDP"), an electrophoretic display ("EPD") panel, or an electrowetting display ("EWD") panel, in accordance with a type of implementation of image. The display panel 300 may be a flat panel display ("FPD"), a flexible display panel or a rounded display panel, in accordance with a desired appearance of the display panel 300.

The first substrate 310 may support the display element 320 and may serve as a main substrate of the display panel 300.

The first substrate 310 may be a glass substrate or a plastic substrate to keep a physical strength and chemical stability. If the first substrate 310 is a glass substrate, the first substrate 310 may include silicon oxide (SiOx). If the first substrate 310 is a plastic substrate, the first substrate 310 may include at least one of polyacrylate ("PAR"), polyetherimide ("PEI"), polyethylene terephthalate ("PET"), polyethylene naphthalate ("PEN"), polyphenylene sulfide ("PPS"), polyimide, and polycarbonate (PC), and the like.

The display element 320 may implement formation of an image on the first substrate 310. The display element 320 may include various elements according to the type of image to be implemented. In exemplary embodiments, the display element 320 may include a pixel electrode, a common electrode, a liquid crystal, a color filter and a backlight unit. The display panel 300 may serve as the LCD panel. In exemplary embodiments, the display element 320 may include a pixel electrode, an opposite electrode and an organic light emitting element. The display panel 300 may serve as the OLED panel. In exemplary embodiments, the display element 320 may include an address electrode, a phosphor layer, a dielectric layer, a scan electrode and a sustain electrode. The display panel 300 may serve as the PDP. In exemplary embodiments, the display element 320 may include a pixel electrode, a common electrode and electrophoretic particles. The display panel 300 may serve as the EPD panel.

The display element 320 may include a plurality of cells, and the cells may configure the pixels of the display panel 300. Each of the pixels may include e.g., a red sub pixel, a green sub pixel or a blue sub pixel distinguishable from each other.

In exemplary embodiments, the display element 320 may further include a switch electrically connected to each sub pixels. For example, the switch may be a thin film transistor ("TFT").

The second substrate 330 may face the first substrate 310, and may protect the display element 320 from the external environment.

The second substrate 330 may include a transparent glass or a transparent plastic to easily transmit the light emitted from the display element 320.

In exemplary embodiments, the second substrate 330 may have substantially the same coefficient of thermal expansion as that of the first substrate 310. If the coefficient of thermal expansion of the second substrate 330 is substantially the same as the coefficient of thermal expansion of the first substrate 310, problems associated with breaks in the coupling between the first substrate 310 and the second substrate 330 may be minimized even though a heat treatment is performed.

The sealant 340 may be formed using the sealant composition. As described above, the sealant composition and therefore the sealant 340, may include a sealing resin and a plurality of microcapsules.

The microcapsules may include a self-curable healing agent, so that the sealant 340 may be capable of curing an internal crack. Thus, the sealant 340 having a small thickness may closely and tightly encapsulate a gap between the first substrate 310 and the second substrate 330. Since a component and/or composition of the sealant 340 is substantially the same as, or similar to, the sealant composition described above with reference to FIGS. 1A to 1C, a duplicate description will not be repeated.

As described above, the sealant 340 is capable of curing internal cracks, so that the display panel 300 may have improved durability and reliability, and the bezel of the display panel 300 may have a small thickness.

In exemplary embodiments, the display panel 300 may be formed by a step of coating the sealant composition on the first substrate 310, a step of disposing the second substrate on the first substrate such that the first substrate and the second substrate face each other, and a step of hardening the sealant composition to form the sealant 340.

The sealant composition may be coated on the first substrate 310 to surround the display element 320. That is, the sealant composition may be coated along a quadrangular outline of the display element 320.

The coating may be performed by using a method such as a slit coating method, a spray coating method, an inkjet printing method, etc.

The second substrate 330 may have substantially the same area as that of the first substrate 310. The second substrate 330 may be disposed on the coated sealant composition, and may be superimposed on the first substrate 310.

The sealant composition may be hardened to form the sealant 240. The sealant 340 combines the first substrate 310 and the second substrate 330, and the sealant 340 may be formed by the hardening of the sealant composition.

In exemplary embodiments, the hardening may be performed using a light e.g., ultra violet ("UV") light. When the UV light is incident, photopolymerization may be induced by a photoinitiator, and a photo-curing hardener may be used to cure the sealing resin.

In exemplary embodiments, the hardening may be performed by applying heat ranging from about 110° C. to about 170° C., to the sealant composition. When the heat is applied to the sealant composition, a thermosetting hardener may cure the sealing resin.

The present invention may be applied to any electronic device. For example, the present invention may be applied to a semiconductor device, a memory device, a display panel e.g., an LCD panel, an OLED panel, a PDP, an EPD panel, an EWD panel, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A sealant composition, comprising:
a curable sealing resin; and
a plurality of microcapsules dispersed in the sealing resin, each of the microcapsules comprising:
a self-curable healing agent; and
a capsule coating film encapsulating the healing agent, wherein the capsule coating film has an elastic modulus lower than an elastic modulus of the sealing resin.

2. The sealant composition of claim 1, wherein the healing agent is self-cured upon exposure to moisture.

3. The sealant composition of claim 2, wherein the healing agent comprises at least one of a cyanoacrylate derivative and a urethane derivative.

4. The sealant composition of claim 1, wherein the capsule coating film has a moisture permeability greater than a moisture permeability of the sealing resin.

5. The sealant composition of claim 1, wherein the capsule coating film comprises at least one of an acrylate-based polymer, a polyurethane-based polymer and a polyurea-based polymer.

6. The sealant composition of claim 1, wherein the microcapsules have a diameter of about 2 µm to about 20 µm.

7. The sealant composition of claim 1, wherein an amount of the microcapsules is equal to or less than about 20% by volume, based on a total volume of the sealant composition.

8. The sealant composition of claim 1, wherein the sealing resin comprises a modified epoxy resin comprising at least one of an acrylate group, an isocyanate group and a hydroxyl group.

9. The sealant composition of claim 1, further comprising an alkali metal-based catalyst.

10. The sealant composition of claim 1, further comprising a softening agent.

11. A method of manufacturing a sealant composition, comprising:
preparing a solution of a self-curable healing agent;
forming a capsule coating film encapsulating the healing agent;
curing the capsule coating film to form a plurality of microcapsules; and
mixing the microcapsules with a curable sealing resin,
wherein the capsule coating film has an elastic modulus lower than an elastic modulus of the sealing resin.

12. The method of claim 11, wherein the healing agent solution is prepared by dispersing at least one of a cyanoacrylate derivative and a urethane derivative into an organic solvent.

13. The method of claim 11, wherein forming the capsule coating film comprises:
extruding a coating solution together with the healing agent solution through a micro-nozzle, wherein the coating solution comprises a polymer for forming the capsule coating film; and
forming a droplet comprising the capsule coating film and the healing agent.

14. The method of claim 13, wherein the droplet is formed using an ultrasonic wave generator.

15. The method of claim 13, wherein the polymer for forming the capsule coating film comprises at least one of an acrylate-based polymer, a polyurethane-based polymer and a polyurea-based polymer.

16. A display panel, comprising:
a first substrate;
a display element comprising a plurality of pixels on the first substrate;
a second substrate facing the first substrate; and
a sealant surrounding the display element between the first substrate and the second substrate, the sealant comprising a sealant composition that comprises,
a curable sealing resin; and
a plurality of microcapsules dispersed in the sealing resin, each of the microcapsules comprising a self-curable healing agent and a capsule coating film encapsulating the healing agent, wherein the capsule coating film has an elastic modulus lower than an elastic modulus of the sealing resin.

17. The display panel of claim 16, wherein the healing agent comprises at least one of a cyanoacrylate derivative and a urethane derivative.

18. The display panel of claim 16, wherein the capsule coating film has a moisture permeability greater than a moisture permeability of the sealing resin.

* * * * *